Aug. 8, 1939.  H. W. KOST  2,169,182
FASTENER
Filed Dec. 19, 1938
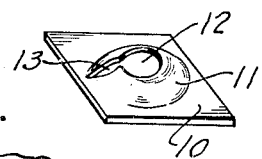
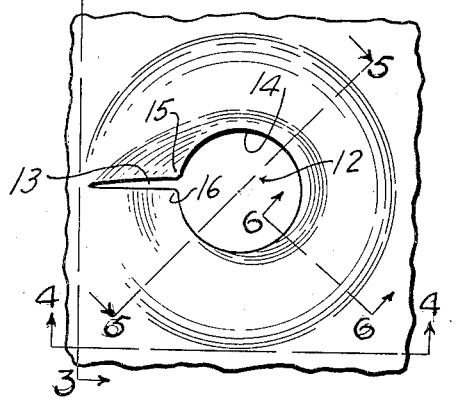
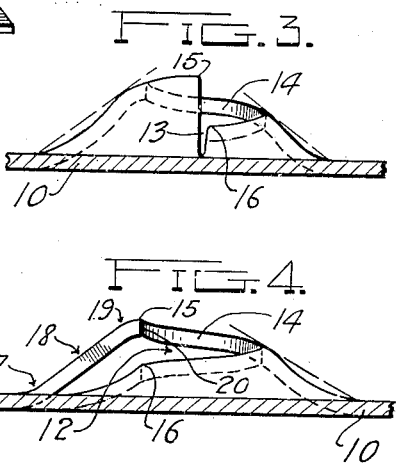
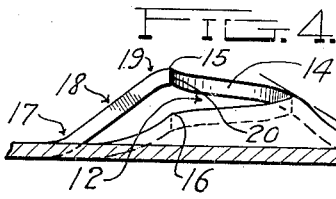
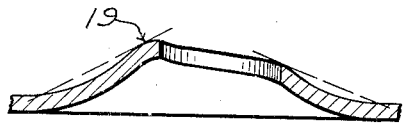
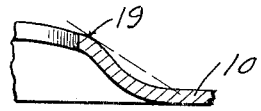
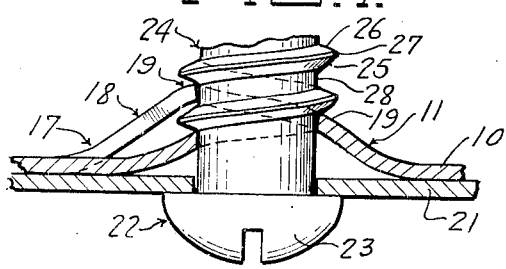
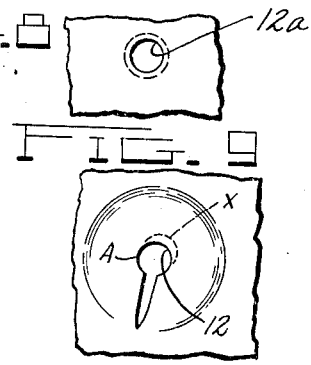
Inventor
Harold W. Kost
By Melchu W. Fraser
Attorney Patented Aug. 8, 1939

2,169,182

UNITED STATES PATENT OFFICE 2,169,182

FASTENER

Harold W. Kost, Birmingham, Mich., assignor to Prestole Devices, Inc., Detroit, Mich., a corporation of Michigan Application December 19, 1938, Serial No. 246,694

10 Claims. (Cl. 85—32)

This invention relates to fasteners of the type embodying sheet metal structure or elements designed for self-locking threaded engagement by a screw. More particularly, the invention is concerned with the construction of the self-locking thread and the portion of the sheet metal structure or element adjacent thereto and which has been modified in forming the thread.

Where a strong, self-locking thread is formed in sheet metal, it is necessary to pierce the sheet metal body to provide an initial opening and the material of the body adjacent the opening must be upset or displaced from the plane of the said body, to form a protuberance to produce the required strength and the compressible or displaceable material which produces the desired self-locking action. At the edge of the opening is employed as the self-locking thread, it is necessary to develop this edge so that it will correspond throughout its length with the helix angle of the thread on the screw to be associated therewith. If the threads of the sheet metal body and the screw are to engage for a complete convolution, the high and low points of the self-locking thread helix or convolutions; i. e., the extremities of the threads formed in said body, must be spaced a distance equal to the pitch of the screw thread. These extremities, therefore, are spaced different distances from the plane of the sheet metal structure or element, and this difference corresponds with the pitch of the screw thread.

Considerable difficulty has been encountered in providing enough metal for the high point of the helix while disposing of or confining the excess material at the low point of the helix and in gradually developing the desired helical formation between these two extremes without producing a final hole which is egg or oblong in shape. Imperfect holes of this character make it impossible to readily insert the screw and cause the metal around the developed hole to lay away from the root diameter of the screw, when the latter is tightened down, thereby creating a tendency to shear through the metal at these points.

It is one of the primary objects of this invention to provide a self-locking thread in sheet metal structures or elements which will possess a more nearly round developed hole, whereby the self-locking thread will uniformly engage the inner face of the screw thread throughout the length of the former.

A further important object of the invention is to arrange the helical edge portion of the developed hole so that it will engage the inner side of the screw in a way to cause the metal forming the edge of the self-locking thread to be forced against the root surface of the screw, regardless of the shape of said surface and to prevent the outer sharp edge of the developed hole from shearing off the crest portion of the screw thread by arranging the edge wall parallel to the root surface.

Another object of the invention is to provide a developed hole, having its edge shaped to form a helix, which will allow for the passage of the screw and which may be developed from a pierced hole of a sufficiently small diameter to obtain the maximum of binding action of the helical edge against the root of the screw.

Still another object of the invention is to form a protuberance, which is to be developed into a self-locking thread, of such a shape and to blend the shape or profile of the protuberance into the plane of the surrounding metal of the body in such a way as to provide a much stronger protuberance than has heretofore been developed.

A still further object of the invention is to so shape and position the edge portion of the helix that when thick metal is used with threads of relatively small pitch the metal of the helix will not bind on the outer face of the screw thread.

Other objects and advantages of the invention will be apparent during the course of the following description.

For purposes of illustration but not of limitation, an embodiment of the invention is shown on the accompanying drawing in which:

Figure 1 is a perspective view of a sheet metal element having the self-locking thread embodying this invention formed therein;

Figure 2 is an enlarged, plan view of the self-locking thread formation disclosed in Fig. 1;

Figure 3 is a partly sectional view and partly elevational view taken on the line 3—3 of Fig. 2;

Figure 4 is a similar view to Fig. 3 but taken on line 4—4 of Fig. 2;

Figure 5 is a transverse sectional view taken on line 5—5 of Fig. 2;

Figure 6 is a detail transverse sectional view taken on line 6—6 of Fig. 2;

Figure 7 is a detail sectional view of the self-locking thread formation disclosed in the preceding figures with a screw applied thereto.

Figure 8 is a top plan view of the sheet metal element showing the formation of the hole after the element has been initially pierced; and Figure 9 is a top plan view of the self-locking thread formation showing by a dotted line the approximate shape of the hole in an intermediate forming step.

The illustrated embodiment of the invention shown in the several figures comprises a sheet metal body 10 which is intended to be representative of all structures or elements which are suitable for having the self-locking thread of this invention applied thereto. In other words, the body 10 may take the form of the square specifically disclosed in Fig. 1, or it may be a small piece of metal of any desired shape differing from that disclosed. Also, the body 10 may take the form of a large panel or sheet which has formed therein several of the self-locking thread formations embodying this invention.

The body 10 has formed therein a substantially cone-shaped protuberance which is designated in its entirety by the reference character 11 and the center or apex of this protuberance is pierced to form a hole 12 with a radially extending slot 13 which is formed in the wall of the protuberance and extends from the edge of the hole 12 to the base of the protuberance. The edge wall of the hole 12 is to be shaped or developed by suitable tools so that it will take the form of a helix of a length substantially equal to one complete convolution of the thread of the screw which is to be associated with this self-locking thread formation.

In shaping or developing the edge wall 14 of the hole 12 into a helix of a length which substantially corresponds with a complete convolution of a thread, it is necessary to axially space the high point 15 and the low point 16 of the helix a distance equal to the pitch of the thread of the screw which is to be associated with the structure or element represented by the body 10. It will be appreciated, therefore, that a problem is presented in providing enough material for the high point 15 and disposing of or confining the excess material at the low point 16. This difficulty has been very successfully and effectively overcome by the particular profile or shape of the protuberance wall of this invention. This protuberance wall profile or shape will be fully described as follows:

It may be considered that the point half way between the high and low points 15 and 16, respectively, represents the average height of the protuberance. From this central or intermediate point, the protuberance must be progressively higher proceeding in the direction of the high point 15. Proceeding in the opposite direction, or toward the low point 16, the edge of the protuberance must be progressively lower. This difference in height throughout the circumference of the protuberance wall is obtained by varying the cross-sectional shape of the wall of the protuberance as it approaches the high point 15.

Starting with the sectional shape or profile of the protuberance wall at the edge of the slot 13 which corresponds with the high point 15 of the helix, it will be seen that there is a gradual blending or curving of the metal at 17 from the plane of the body 10, and the material is then inclined upwardly and inwardly in substantially a straight line, as at 18. As the wall approaches the edge of the opening or hole 12, it is given a slight inward curve at 19 so that the edge wall or face will be arranged approximately parallel to the axis of the hole 12, as is indicated at 20. This inward curving of the upper edge portion of the protuberance wall, as at 19, is greatest at the high point 15 of the helix and gradually decreases or diminishes in curvature toward the low point 16 with the curvature entirely vanishing at a point about three-quarters of the distance around the edge of the helix. This diminishing and disappearing of this inwardly curved, upper edge portion is very clearly illustrated in Figs. 4, 5, and 6. The curvature 19 has entirely disappeared between the section disclosed in Fig. 6 and the right hand section disclosed in Fig. 5.

Considering now the sectional shape or profile of the protuberance wall at the edge of the slit 13 which corresponds with the low point 16 of the helix, which section is best illustrated in Figs. 3 to 7, it will be seen that the wall of the protuberance is drawn up from the plane of the body 10 on a gradual sweep to provide a concavo-convex formation with the concave surface being presented outwardly. Fig. 7 best illustrates this sectional formation at the start of the low portion of the helix. The low point 16 of the helix is intended to be displaced from the plane of the body 10 a distance substantially equal to the pitch of the screw to be received within the developed hole 12. Considering the wall of the protuberance exteriorly, the point of maximum concavity is at the edge of the slot 13 corresponding to the low point 16 of the helix. Progressing circumferentially of the protuberance wall toward the high point 15, the concavity, or concave exterior of the protuberance, gradually decreases or diminishes until it entirely disappears, as is evidenced by the straight line central portion 18 disclosed in Fig. 4 in connection with the high point 15 of the helix. It will be seen, therefore, that the inwardly curved, upper edge portion 19 of the protuberance gradually decreases or diminishes in one direction while the exterior concavity of the protuberance wall gradually diminishes in the opposite direction. In this way, the edge wall 14 of the opening 12 may be developed to form a more nearly circular or round hole with the low point 16 of the helical edge spaced from the plane of the body 10 a distance substantially equal to one pitch length while the high point 15 of the helix will be spaced above the low point 16 a distance equal to the pitch of the screw thread and will be located above the plane of the body 10 a distance equal to twice the pitch of the thread.

It will be understood from an examination of Figure 8 that in the formation of the fastener, the sheet metal is pierced by a round punch to remove a part of the metal and thereby provide a round opening 12ᵃ. In the subsequent forming of the fastener and when the metal at the sides of the slit 13 is bent to form the high and low points of the helix, the metal in the region of the hole 12ᵃ is pulled away from the center, as indicated by the dotted line X on Figure 9, thereby providing a substantially oval or egg shaped opening. It will be apparent that the area A in the region of the high side of the helix cannot be stretched to move the metal toward the area X. Therefore, the metal in the region of the area X is displaced toward the area A to form the substantially round hole 12. Such displacement is accomplished by forming the walls of the protuberance with the gradually varying concave surface above described.

The application of this self-locking thread formed in the protuberance to a screw will be described in connection with Fig. 7. The body 10 with its protuberance 11 is disclosed in this figure as being attached to an object 21 by means of the screw 22. This screw is formed with a conventional slotted head 23 and a threaded body or shank 24. The body or shank is illustrated as being provided with a well known form of screw thread having the angularly arranged inner and outer side surfaces 25 and 26 with a flat crest surface 27 and a flat root surface 28. It is to be understood that I do not desire to limit myself to this particular form of screw thread profile for the self-locking thread will be fully as applicable to other forms of threads where the root surface is modified; for example, where the root surface is of V shape or is rounded.

Fig. 7 clearly illustrates the extreme upper corner or edge of the wall 14 of the hole, throughout the entire length of this wall 14, as engaging the inner side surface 25 of the screw thread. As the screw is tightened down, the protuberance 11 will be compressed or flattened to a certain extent with the result that the edge wall 14 of the hole will be forced radially inwardly throughout its length to effect a binding action against the root surface 28 of the screw body. Naturally, the greater the tightening of the screw the greater the binding action between the edge wall 14 and the root surface 28 of the screw, and the screw may be tightened to such an extent that this binding action will prevent unscrewing or removal of the screw from the self-locking thread formed in the body 10.

Naturally, the thickness of the sheet metal body cannot exceed or even be equal to the pitch of the screw thread. Otherwise, the helical edge would bind against both opposed sides of the screw thread. The relation of the original pierced hole to the final developed hole must vary with variations in the thickness of the metal. The greater the thickness of the metal, the larger the original pierced hole in relation to any given screw size and pitch. It is important to maintain the smallest original pierced hole possible consistent with the development of the developed hole in order that the maximum of binding action may be obtained between the edge wall 14 and the root surface 28 when the screw 22 is tightened down.

It will be appreciated from the preceding description that a more nearly circular or round developed hole, having a helically shaped edge, may be formed by shaping or profiling the wall of the protuberance in the manner described. The formation of the wall of the protuberance, therefore, is considered to be an important feature of this invention. The manner in which the wall of the protuberance blends into the plane of the body 10 without employing any sharp angles or small radii is considered to be a marked improvement over the prior art in which sharp angles are employed at the base of the protuberance. Where such sharp angles are employed, the action of the screw on the protuberance would cause a buckling at the point where the metal of the protuberance leaves the plane of the body 10 and an inferior fastening structure would be provided. Great importance is placed on the arrangement of the edge wall of the developed hole in parallelism with the root surface of the screw thread. In prior art structures, the edge wall is arranged at an angle to the root surface which causes the sharp outer edge to shear off the outer portion of the screw thread before the maximum pressure is applied. Another very important structural feature is the concavo-convex shape of the protuberance wall which provides great resistance to failure or collapse.

It is to be understood that the invention is not limited to the particular embodiment illustrated and described, for changes in details of construction may be effected without departing from the spirit of the invention, especially as defined in the appended claims.

What I claim is:

1. A fastener of the type embodying a sheet metal structure or element designed for self-locking engagement by a screw comprising a substantially conical protuberance extending from the surface plane of said structure and having an opening in its apex for the passage of a screw, the edge wall of said opening being shaped to provide a single helical thread with the high and low points thereof separated by a radial slot, the wall of said protuberance being so shaped in radial section as to provide a gradually varying exterior concave surface circumferentially of the protuberance with the zone of greatest curvature occurring at the low point of the helix and changing from this to a substantially straight surface at the high point of the helix.

2. A fastener of the type embodying a sheet metal structure or element designed for self-locking engagement by a screw comprising a substantially conical protuberance extending from the surface plane of said structure and having an opening in its apex for the passage of a screw, the edge wall of said opening being shaped to provide a single helical thread with the high and low points thereof separated by a radial slot, the wall of said protuberance being so shaped in radial section as to provide a gradually varying concave surface circumferentially of the protuberance with the zone of greatest curvature occurring at the low point of the helix and changing from this to a substantially straight surface at the high point of the helix, the free edge portion of the opening in the protuberance at the high point of the helix being curved inwardly toward the axis of the protuberance to a sufficient extent to position the edge surface of the opening approximately parallel to the axis of the protuberance, and with said inward curving continuing circumferentially of the protuberance but gradually decreasing toward the low point of the helix at a rate which will cause the curving to vanish before it reaches said low point.

3. A fastener of the type embodying a sheet metal structure or element designed for self-locking engagement by a screw comprising a substantially conical protuberance extending from the surface plane of said structure and having an opening in its apex for the passage of a screw, the edge wall of said opening being shaped to provide a single helical thread with the high and low points thereof separated by a radial slot, the wall of said protuberance being so shaped in radial section as to provide a gradually varying concave surface circumferentially of the protuberance with the zone of greatest curvature occurring at the low point of the helix and changing from this to a substantially straight surface at the high point of the helix, the free edge portion of the opening in the protuberance at the high point of the helix being curved inwardly toward the axis of the protuberance to a sufficient extent to position the edge surface of the opening approximately parallel to the axis of the protuberance, and with said inward curving continuing circumferentially of the protuberance, gradually decreasing toward the low point of the helix at a rate which will cause the said curving to vanish at a point approximately three-quarters of the length of the edge.

4. A fastener of the type embodying a sheet metal structure or element designed for self-locking engagement by a screw comprising a substantially conical protuberance extending from the surface plane of said structure and having an opening in its apex for the passage of a screw, the edge wall of said opening being shaped to provide a single helix with the high and low points thereof separated by a radial slot, the free edge portion of the opening in the protuberance at the high point of the helix being curved inwardly toward the hole axis to a sufficient extent to position the edge surface of the opening approximately parallel to the axis of the opening, and with said inward curving continuing circumferentially of the protuberance but gradually decreasing toward the low point at a rate which will cause the curving to vanish before it reaches said low point.

5. A fastener of the type embodying a sheet metal structure or element designed for self-locking engagement by a screw comprising a substantially conical protuberance extending from the surface plane of said structure and having an opening in its apex for the passage of a screw, the edge wall of said opening being shaped to provide a single helical thread with the high and low points thereof separated by a radial slot, the free end portion of the opening in the protuberance at the high point of the helix being curved inwardly toward the hole axis to a sufficient extent to position the edge surface of the opening approximately parallel to the axis of the opening and with said inward curving continuing circumferentially of the protuberance but gradually decreasing toward the low point at a rate which will cause the curving to vanish before it reaches said low point, said protuberance being free from sharp angles or bends where its wall joins with the plane of the structure.

6. A fastener of the type embodying a sheet metal structure or element designed for self-locking engagement by a screw comprising a substantially conical protuberance extending from the surface plane of said structure and having an opening in its apex for the passage of a screw, the edge wall of said opening being shaped to provide a single helix with the high and low points thereof separated by a radial slot, the free edge portion of the opening in the protuberance at the high point of the helix being curved inwardly toward the hole axis to a sufficient extent to position the edge wall of said opening approximately parallel to the axis of the opening and with said inward curving continuing circumferentially of the protuberance but gradually decreasing toward the low point of the helix at a rate which will cause the curving to vanish at a point approximately three-quarters of the length of the edge, said protuberance being free from sharp angles or bends where its wall joins with the plane of the structure.

7. A fastener of the type embodying a sheet metal structure or element designed for self-locking engagement by a screw comprising a substantially conical protuberance extending from the surface plane of said structure and having an opening in its apex for the passage of a screw, the edge wall of said opening being shaped to provide a single helical thread with the high and low points thereof separated by a radial slot, the wall of said protuberance being shaped in radial section at the edge of the slot, corresponding with the high point of the helix, to provide a relatively long straight intermediate portion and reversely curved end portions, the said wall being of exterior concave shape in radial section at the other edge of the slot, and said wall intermediate the edges of the slot gradually changing in section from said convex shape to the shape including the intermediate straight portion and the reversely curved end portion.

8. A fastener of the type embodying a sheet metal structure or element designed for self-locking engagement by a screw, a protuberance extending from the surface plane of said structure and having a hole in its apex for the passage of a screw with the edge wall of said hole being developed to provide a single helix with the high and low points thereof separated by a radial slit, the wall of said protuberance being exteriorly concave starting with the low point of the helix and extending partially around the periphery of the protuberance, the free edge portion of the protuberance being curved inwardly starting with the high point of the helix and extending around the periphery of the protuberance toward the low point of the helix with said edge curving gradually diminishing toward said low point, the exterior concavity of the protuberance wall and the curving of the free edge portion of the protuberance overlapping each other throughout a portion of the intermediate part of the protuberance wall.

9. A fastener of the type embodying a sheet metal structure or element designed for self-locking engagement by a screw comprising a protuberance extending from the surface plane of said structure and having an opening in its apex for the passage of a screw, the edge wall of said opening being shaped to provide a single helical thread with the high and low points thereof separated a distance equal to the pitch of the screw thread, the wall of said protuberance being so shaped in radial section as to provide a gradually varying exterior concave surface circumferentially of the protuberance with the zone of greatest curvature occurring at the low point of the helix and changing from this to a substantially straight surface at the high point of the helix.

10. A fastener of the type embodying a sheet metal structure or element designed for self-locking engagement by a screw comprising a protuberance extending from the surface plane of said structure and having an opening in its apex for the passage of a screw, the edge wall of said opening being shaped to provide a single helical thread with the high and low points thereof separated a distance equal to the pitch of the screw thread, the free edge portion of the opening in the protuberance at the high point of the helix being curved inwardly toward the axis of the protuberance to a sufficient extent to position the edge surface of the opening approximately parallel to the axis of the protuberance, and with said inward curving continuing circumferentially of the protuberance, gradually decreasing toward the low point of the helix at a rate which will cause the said curving to vanish at a point approximately three-quarters of the length of the edge.

HAROLD W. KOST.